Dec. 14, 1965  J. HENRY-BAUDOT  3,223,868
A.C. PRINTED-CIRCUIT WINDING
Filed July 27, 1961
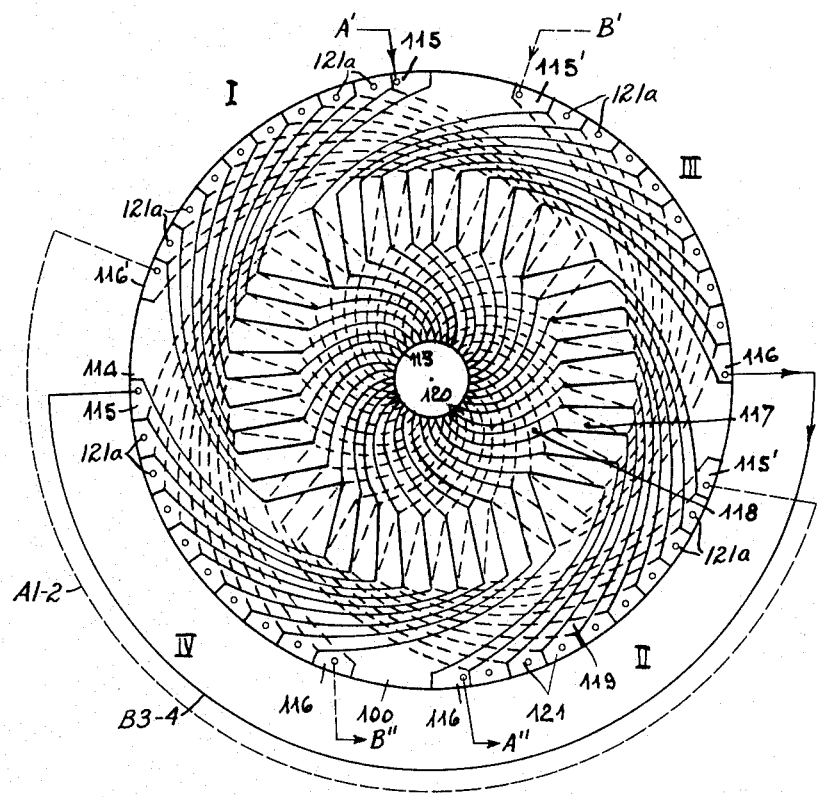

United States Patent Office 3,223,868
Patented Dec. 14, 1965

3,223,868
A.C. PRINTED-CIRCUIT WINDING
Jacques Henry-Baudot, Antony, Seine, France, assignor to Printed Motors Inc., New York, N.Y.
Filed July 27, 1961, Ser. No. 127,204
Claims priority, application France, Sept. 8, 1960, 838,266
3 Claims. (Cl. 310—185)

The present invention concerns improvements in or relating to alternating current windings of the printed-circuit type for axial airgap electric rotary machines wherein such printed-circuit windings are used as inductor windings and are made of two sets of half-turn printed conductors intimately adhering on the opposite faces of a thin insulating carrier and so shaped that the complete pattern of the winding is obtained by face-to-face connections between the ends of said half-turn conductors except at the input and output supply terminals of the winding. For A.C. windings, it appears preferable that the winding be made with as many paths as there are pairs of poles in the machine, and as many groups of such separate paths as there are electrical phases in the supply.

The windings employed in the present invention are formed according to the technique disclosed in my co-pending application Ser. No. 1,128, filed January 7, 1960 (now Patent No. 3,144,574), which was divided out of the earlier filed application Ser. No. 691,434, filed October 21, 1957 (now Patent No. 3,090,880).

In such printed-circuit windings, two conductors which are interconnected from one face to the other one are in principle spaced apart by one polar pitch. Each half-turn conductor comprising an intermediate portion which is substantially radial and is extended at both ends by slanted or curved portions up to the inner and outer peripheries of the carrier, respectively. It is desirable to have the greatest number possible of magnetic poles in order to shorten such slanted or inclined portions which are generally not useful in the electromagnetic operation of the machine. However, in alternating current machines, the whole turn may be considered as entering in the operation since the amount of magnetic flux linked by the turn will be dependent upon the span of the turn. In such A.C. machines, the smaller the number of poles, the greater the number of conductors per pole pitch is desirable. In order not to unduly increase the dimensions of the winding, one has to choose an inner diameter of the annular carrier relatively small so that the area available for the inner connections becomes quite reduced and such connections quite narrow. Consequently, practical difficulties are encountered for establishing such connections which, however, for a small number of poles, must span over a wide angular pitch in the member.

The invention has for its object to so provide a printed-circuit winding of the above-specified kind that such drawbacks are avoided for a small number of poles in the machine. To this end, the invention proposes to shorten by one-third the angular pitch of the conductors and to simultaneously reduce by one-third the number of conductors, which gives 33% of additional area for the inner face-to-face connections and maintains a winding coverage quite acceptable for the efficiency of the machine. The inner and median portions of the conductors are all made contiguous, but the outer portions of the conductors are only made contiguous in groups corresponding to the phases and poles in the machine.

For explaining the invention, reference will be now made to the embodiment shown in the single figure of the accompanying drawings. In said figure is shown a winding for a two-pole machine, i.e., the smallest number of poles possible in a machine, and said winding is provided for a two-phase supply. For the sake of clarity, only a reduced number of conductors is considered in the concerned example whereas, in actual practice, one may understand that the number of conductors will be much higher than the one disclosed in the drawing. The number of conductors in the shown example is only equal to thirty-six; it is an adaptation of a prior winding comprising forty-eight conductors per face since the number of conductors is, according to the invention, reduced by one-quarter.

The inner peripherical portion 113 of the winding member is divided into thirty-six equal divisions, the outer peripherical portion 114 of the member, into forty-eight equal divisions. Thirty-six terminal coatings are provided at the inner peripherical portions, and thirty-six terminal coatings are also provided on the outer peripherical portion, in FOUR groups of nine terminal coatings, three divisions being left unmetallized on said outer peripherical portion of the member. These groups of nine terminal coatings are, as apparent, shifted by one division from one face of the carrier to the other face. The terminal coatings for input of the electrical supply current for each phase coil are marked 115 on the front face of the member and 115' on the rear face of the member, and the output current terminal coatings, for each phase coil, are marked 116 for the front face of the member and 116' for the rear face.

The delineation lines of the front face are shown in solid lines, and the delineation lines of the rear face are shown in interrupted lines, said lines delineating the gaps between adjacent contiguous conductors, or the edges of the conductors which are not contiguous. Each conductor of the front face comprises a median portion 117 extended on both sides by two curved portions, 118 inwards and 119 outwards, ending in respective terminal coatings 120 and 121 (or 115) respectively. Each rear face conductor is similarly shaped. The portions 118 constitute on each face an uninterrupted coating of contiguous but relatively electrically insulated conductors up to the points where they connect to the median parts, whereas said median parts and the outer curved portions of the conductors form four groups of contiguous conductors, said groups leaving naked or bare portions of the insulating carrier between them. Each outer terminal portion 121 on one face of the disc which registers with another terminal portion on the opposite face is connected to the opposite terminal portion by an interface connection 121a. Likewise, each inner terminal portion 120 is connected by an interface connection to a registering inner terminal portion on the opposite face. The two sets of interface connections connect the conductors together to form separate coils marked I, II, III and IV.

The four spools or coils of the winding may be easily followed on the drawing, each from a front terminal 115 to a rear terminal 116' (or from a rear terminal 115' to a front terminal 116), each turn spanning an angular sector of about 120°. The spool I, for instance starts from a front terminal 115 and reaches a rear terminal 116' in a lap type of winding in a counterclockwise direction, whereas the spool II of the same electrical phase (phase A) starts from a rear face terminal 115' and continues up to a front face terminal 116 in a lap type of winding in the clockwise direction. The other phase (phase B) of the winding is made of the spools III and IV, the first part, spool III starting from a rear face terminal 115' and continues up to a front face terminal 116 in a progressive lap type of winding whereas the spool part IV starts from a front face terminal 115 and continues up to a rear face terminal 116, in a recessive lap type of coiling. By external wiring (by connection A1-2), the spools I and II will be serially connected in the phase A circuit between input connection A' and the output connction A". Also, by external connection B3–4, spools III and IV will be serially connected in the phase B circuit between the input connection B′ and the output connection B". From the shown examples it may be easily deduced that any other pattern within the scope of the invention for any different number of poles and phases in the machines.

What is claimed is:

1. A field winding for the stator of an alternating current rotary machine of the flat annular airgap kind, comprising two sets of identically shaped half-turn printed-circuit conductors adhering to the opposite faces of an annular insulating carrier, each conductor comprising a substantially radial mid-portion having arcuate end-portions extending from opposite ends thereof to the inner and outer peripheral edges of said carriers, interface connections extending between registering ends of said conductors on opposite faces of said carrier, the inner end-portions of said conductors on each face of said carrier being formed as contiguous conductor portions spaced apart by narrow air-gaps, the middle portions of said conductors being formed in groups of contiguous conductors, the groups being connected in pairs equal in number to the elementary phases in the electrical supply to be applied to the windings, the said groups of middle portions being spaced apart by bare areas of said carrier, and said middle conductor portions, taken together on both faces of said carrier, covering substantially the complete middle annular area of said carrier, and said outer end-portions of said conductors being arranged in groups of contiguous conductor portions according to the grouping of said middle conductor portions, said groups of outer end-portions being separated by bare areas of said carrier.

2. A field winding according to claim 1, wherein the number of groups of contiguous conductor portions is made a multiple of the number of phases of the electrical supply.

3. A field winding according to claim 1 wherein said groups of conductors are relatively shifted by at least one conductor from one face of the carrier to the other face of said carrier.

References Cited by the Examiner

UNITED STATES PATENTS

| | | | |
|---|---|---|---|
| 402,066 | 4/1889 | Coerper | 310—267 |
| 2,970,238 | 1/1961 | Swiggett | 310—268 |

MILTON O. HIRSHFIELD, *Primary Examiner.*

DAVID X. SLINEY, *Examiner.*